(12) United States Patent
Ohara

(10) Patent No.: US 12,550,119 B2
(45) Date of Patent: Feb. 10, 2026

(54) TERMINAL AND COMMUNICATION METHOD

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 399 days.

(21) Appl. No.: 18/007,337

(22) PCT Filed: Aug. 7, 2020

(86) PCT No.: PCT/JP2020/030515
§ 371 (c)(1),
(2) Date: Jan. 30, 2023

(87) PCT Pub. No.: WO2022/030022
PCT Pub. Date: Feb. 10, 2022

(65) Prior Publication Data
US 2023/0284181 A1    Sep. 7, 2023

(51) Int. Cl.
*H04W 68/02* (2009.01)
*H04W 72/232* (2023.01)

(52) U.S. Cl.
CPC ......... *H04W 68/02* (2013.01); *H04W 72/232* (2023.01)

(58) Field of Classification Search
None
See application file for complete search history.

(56) References Cited

U.S. PATENT DOCUMENTS

| | | | |
|---|---|---|---|
| 2022/0303897 A1* | 9/2022 | Xu | H04W 76/28 |
| 2022/0303941 A1* | 9/2022 | Xu | H04W 52/0229 |
| 2022/0312327 A1* | 9/2022 | Xu | H04W 52/0274 |
| 2022/0330206 A1* | 10/2022 | Li | H04W 68/025 |
| 2022/0338121 A1* | 10/2022 | Fei | H04W 52/0216 |
| 2022/0394617 A1* | 12/2022 | Li | H04W 52/0235 |
| 2023/0063026 A1* | 3/2023 | Reial | H04W 52/0235 |
| 2023/0189147 A1* | 6/2023 | Bala | H04W 68/02 370/311 |
| 2023/0224800 A1* | 7/2023 | Murray | H04W 72/1273 370/329 |
| 2023/0276362 A1* | 8/2023 | Reial | H04W 56/0015 370/311 |

FOREIGN PATENT DOCUMENTS

WO    2020065888 A1    4/2020

OTHER PUBLICATIONS

Office Action issued in Japanese Patent Application No. 2022-541098, dated Dec. 3, 2024 (4 pages).
3GPP TSG RAN WG1 #101; R1-2003489; ZTE; "Views on power saving enhancement"; e-Meeting, May 25-Jun. 5, 2020 (11 pages).

(Continued)

*Primary Examiner* — Clemence S Han
(74) *Attorney, Agent, or Firm* — Osha Bergman Watanabe & Burton LLP

(57) ABSTRACT

A terminal includes: a receiving unit configured to receive signals indicating whether or not monitoring of PDCCH (Physical Downlink Control Channel) monitoring occasions for paging is necessary, prior to the PDCCH monitoring occasions, from a base station; and a control unit configured to determine whether or not to monitor the PDCCH monitoring occasions, based on the signals.

4 Claims, 8 Drawing Sheets

(56) References Cited

OTHER PUBLICATIONS

Office Action issued in Chinese Patent Application No. 202080104514.5, dated Jan. 25, 2025 (10 pages).
3GPP TS 38.300 V16.0.0 "3rd Generation Partnership Project; Technical Specification Group Radio Access Network; NR; NR and NG-RAN Overall Description; Stage 2 (Release 16)" Dec. 2019 (101 pages).
International Search Report issued in International Application No. PCT/JP2020/030515, mailed Mar. 23, 2021 (5 pages).
Written Opinion issued in International Application No. PCT/JP2020/030515; Dated Mar. 23, 2021 (3 pages).
Office Action issued in Chinese Patent Application No. 202080104514.5, mailed on Jun. 19, 2024 (13 pages).
Office Action issued in Japanese Application No. 2022-541098, mailed Jun. 11, 2024 (4 pages).

\* cited by examiner

TERMINAL AND COMMUNICATION METHOD

TECHNICAL FIELD

The present invention relates to a terminal and a communication method in a radio communication system.

BACKGROUND ART

In NR (New Radio) (also referred to as "5G") that is a successor system to LTE (Long Term Evolution), a technology satisfying a large-capacity system, a high-speed data transmission rate, low delay, simultaneous connection of a large number of terminals, low cost, power saving, and the like as requirements has been discussed (for example, Non-Patent Document 1).

In NR Release 17, the power saving operation of a terminal in the idle mode or the inactive mode in consideration of the system performance has been discussed. For example, a method of suppressing unnecessary paging reception without affecting the legacy UE is being discussed.

CITATION LIST

Non-Patent Document

Non-Patent Document 1: 3GPP TS 38.300 V16.0.0 (2019-12)

SUMMARY OF THE INVENTION

Problem to be Solved by the Invention

In conventional paging, a terminal cannot know in advance whether or not it is necessary to attempt monitoring or reception of PDCCH (Physical Downlink Control Channel). For this reason, unnecessary monitoring may occur, which has been an obstacle to power saving.

The invention has been made in view of the above points, and it is an object of the invention to reduce power consumption when monitoring paging in a radio communication system.

Means for Solving Problem

According to the disclosed technique, there is provided a terminal including: a receiving unit that receives signals indicating whether or not monitoring of PDCCH (Physical Downlink Control Channel) monitoring occasions for paging is necessary, prior to the PDCCH monitoring occasion, from a base station; and a control unit configured to determine whether or not to monitor the PDCCH monitoring occasions, based on the signals.

Effect of the Invention

According to the disclosed technique, it is possible to reduce the power consumption when monitoring paging in the radio communication system.

MODE(S) FOR CARRYING OUT THE INVENTION

Hereinafter, an embodiment of the invention will be described with reference to the drawings. In addition, the embodiment described below is an example, and the embodiment to which the invention is applied is not limited to the following embodiment.

In the operation of the radio communication system according to the embodiment of the invention, conventional technologies are appropriately used. The conventional technologies include, for example, conventional LTE, but is not limited to the conventional LTE. In addition, the term "LTE" used in this specification has a broad meaning including LTE-Advanced and systems (for example, NR) after LTE-Advanced unless otherwise specified.

In addition, in the embodiment of the invention described below, terms such as SS (Synchronization signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), and PUSCH (Physical Uplink Shared Channel) used in the conventional LTE are used. This is for convenience of description, and signals, functions, and the like similar to the above may be referred to as other names. In addition, the above-described terms in NR correspond to NR-SS, NR-PSS, NR-SSS, NR-PBCH, NR-PRACH, and the like. However, even a signal used in NR is not necessarily expressed as "NR-".

In addition, in the embodiment of the invention, a duplex method may be a TDD (Time Division Duplex) method, an FDD (Frequency Division Duplex) method, or any other method (for example, Flexible Duplex).

In addition, in the embodiment of the invention, "configure" a radio parameter or the like may mean pre-configure a predetermined value or configure a radio parameter indicated by a base station 10 or a terminal 20.

Figure 1:
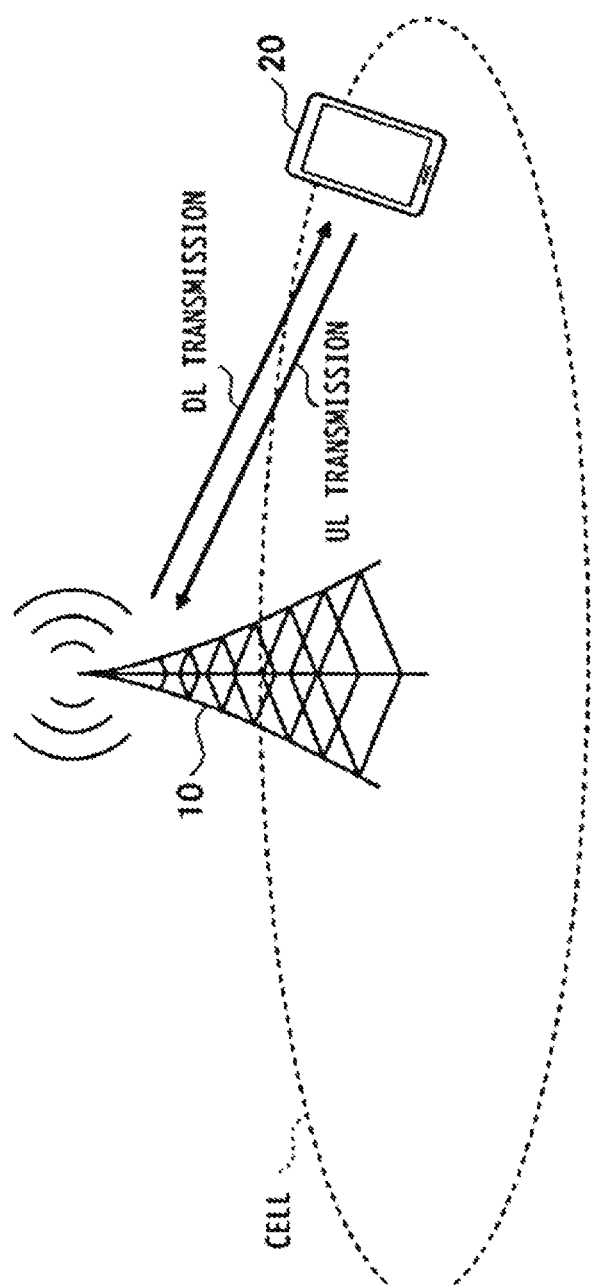
FIG. 1 A drawing illustrating a configuration example of a radio communication system according to an embodiment of the invention.

FIG. 1 is a drawing illustrating a configuration example of a radio communication system according to the embodiment of the invention. As shown in FIG. 1, the radio communication system according to the embodiment of the invention includes the base station 10 and the terminal 20. FIG. 1 shows one base station 10 and one terminal 20, but this is an example, and a plurality of base stations 10 and a plurality of terminals 20 may be provided.

The base station 10 is a communication device that provides one or more cells and performs radio communication with the terminal 20. The physical resource of a radio signal is defined in a time domain and a frequency domain, and the time domain may be defined by the number of OFDM (Orthogonal Frequency Division Multiplexing) symbols, and the frequency domain may be defined by the number of subcarriers or the number of resource blocks. The base station 10 transmits a synchronization signal and system information to the terminal 20. The synchronization signal is, for example, NR-PSS and NR-SSS. The system information is transmitted through the NR-PBCH, for example, and is also referred to as broadcast information. As shown in FIG. 1, the base station 10 transmits a control signal or data to the terminal 20 by DL (Downlink), and receives a control signal or data from the terminal 20 by UL (Uplink). Both the base station 10 and the terminal 20 can perform beam forming to transmit and receive signals. In addition, both the base station 10 and the terminal 20 can apply MIMO (Multiple Input Multiple Output) communication to DL or UL. In addition, both the base station 10 and the terminal 20 may communicate with each other through SCell (Secondary Cell) and PCell (Primary Cell), according to CA (Carrier Aggregation). In addition, the terminal 20 may perform communication through the primary cell of the base station 10 and a primary secondary cell group cell (PSCell) of another base station 10, according to DC (Dual Connectivity).

The terminal 20 is a communication device having a radio communication function, such as a smartphone, a mobile phone, a tablet, a wearable terminal, and a communication module for M2M (Machine-to-Machine). As shown in FIG. 1, the terminal 20 uses various communication services provided by the radio communication system by receiving a control signal or data from the base station 10 by DL and transmitting a control signal or data to the base station 10 by UL.

Here, in NR release 17, the power saving operation of the terminal 20 in the idle mode or the inactive mode in consideration of the system performance has been discussed. For example, a method of suppressing unnecessary paging reception without affecting the legacy UE has been discussed.

Figure 2:
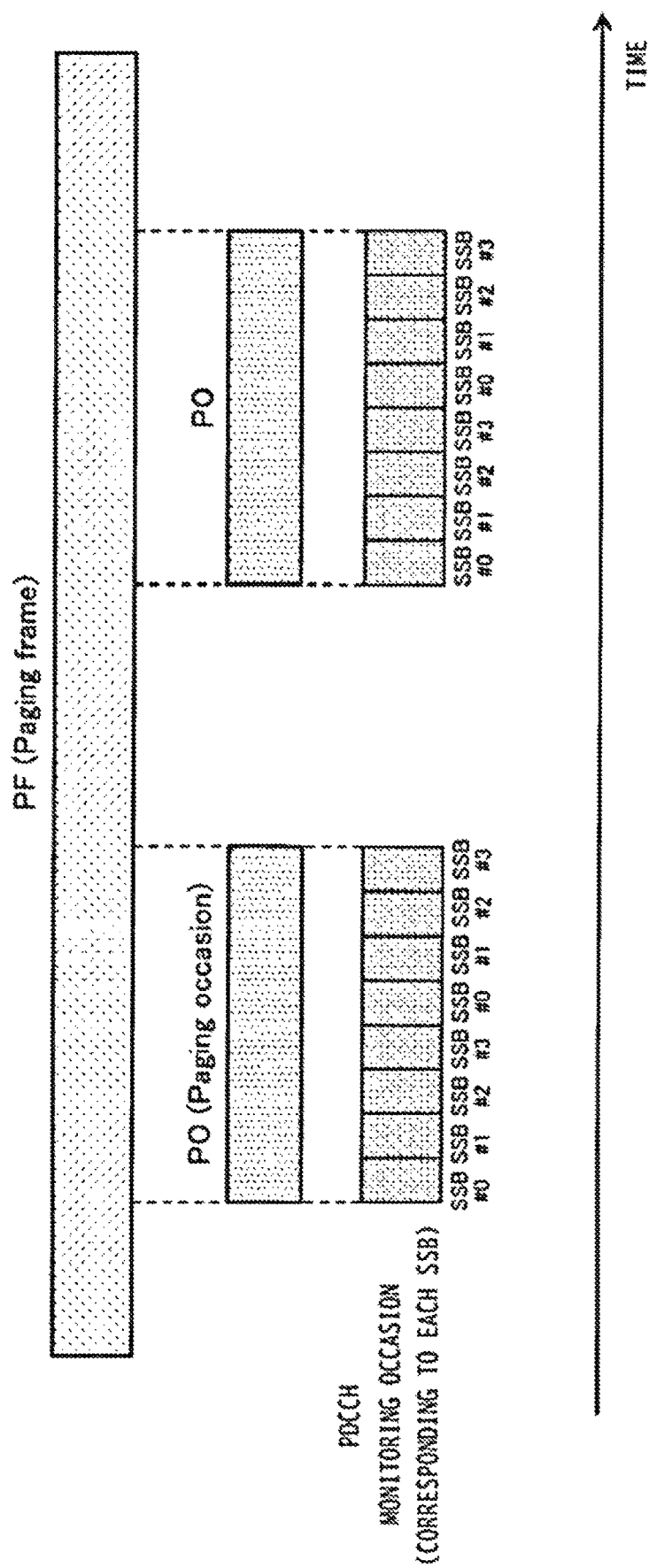
FIG. 2 A drawing illustrating an example of a configuration related to paging.

FIG. 2 is a drawing illustrating an example of a configuration related to paging. In the paging of the terminal 20 in the idle mode or the inactive mode, PF (Paging frame), PO (Paging occasion), and PDCCH monitoring occasion are configured as shown in FIG. 2. FIG. 2 schematically shows the relative positions of PF, PO, and PDCCH monitoring occasions in the time domain. Hereinafter, the PDCCH monitoring occasions for paging are also simply referred to as PDCCH monitoring occasions.

The PF is determined by calculating the position addressed to the terminal 20 itself, based on the terminal identifier (for example, UE-ID) or the like. The PF also includes one or more POs or start positions of POs in the time domain.

The PO is determined by calculating the position addressed to the terminal 20 itself, based on the terminal identifier (for example, UE-ID) or the like. In addition, the PO also includes one or more PDCCH monitoring occasions in the time domain.

Regarding the PDCCH monitoring occasions, as shown in FIG. 2, a PDCCH monitoring occasion corresponding to each SSB (SS/PBCH block) (in FIG. 2, each of SSB #0, SSB #1, SSB #2, and SSB #3) is configured. For example, for one PO, a plurality of PDCCH monitoring occasions corresponding to a certain SSB can be configured by the network.

In conventional paging, a terminal cannot know in advance whether or not it is necessary to attempt monitoring or reception of PDCCH (Physical Downlink Control Channel), and thus, unnecessary monitoring may occur, which has been an obstacle to power saving.

Therefore, the base station 10 may indicate in advance, to the terminal 20, whether or not it is necessary to try monitoring/reception of the paging PDCCH and/or PDSCH. Hereinafter, a signal for indicating in advance, to the terminal 20, whether or not it is necessary to try monitoring/reception of the paging PDCCH and/or PDSCH is referred to as a paging wake up signal, but is not limited to the paging wake up signal, and may be referred to as another name. The paging wake up signal may be denoted as paging WUS (wake up signal).

Figure 3:
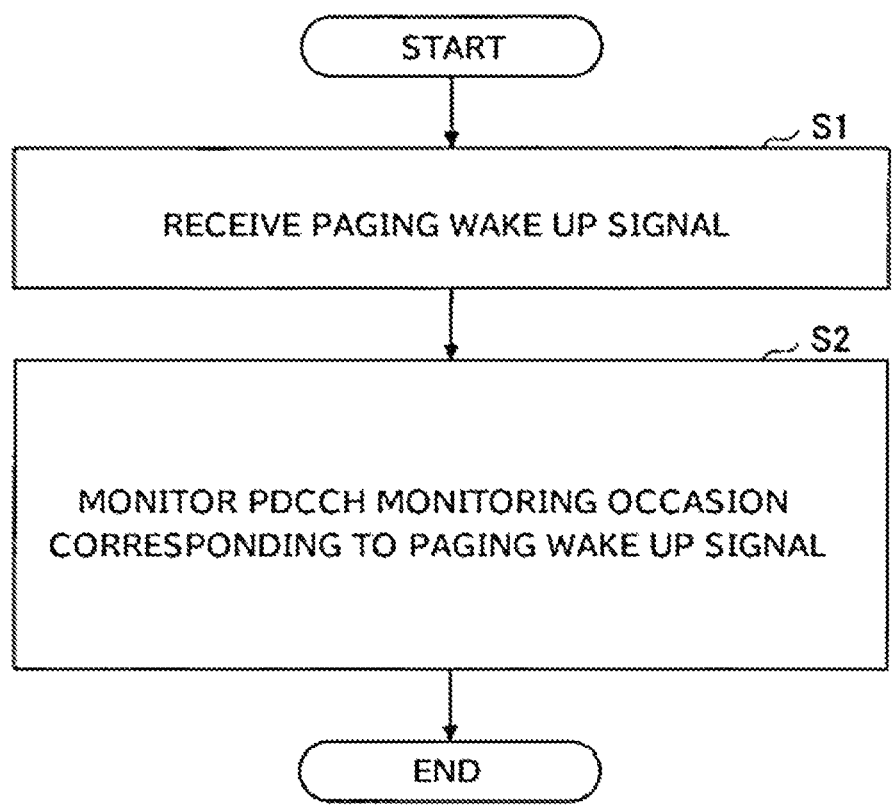
FIG. 3 A flowchart illustrating an example of a paging operation in an embodiment of the invention.

FIG. 3 is a flowchart illustrating an example of a paging operation in the embodiment of the invention. In step S1, the terminal 20 receives a paging wake up signal from the base station 10. In the subsequent step S2, the terminal 20 monitors a PDCCH monitoring occasion corresponding to the paging wake up signal. In a case where the terminal 20 performs monitoring and succeeds in receiving the paging, the terminal 20 starts communication with the base station 10.

Figure 4:
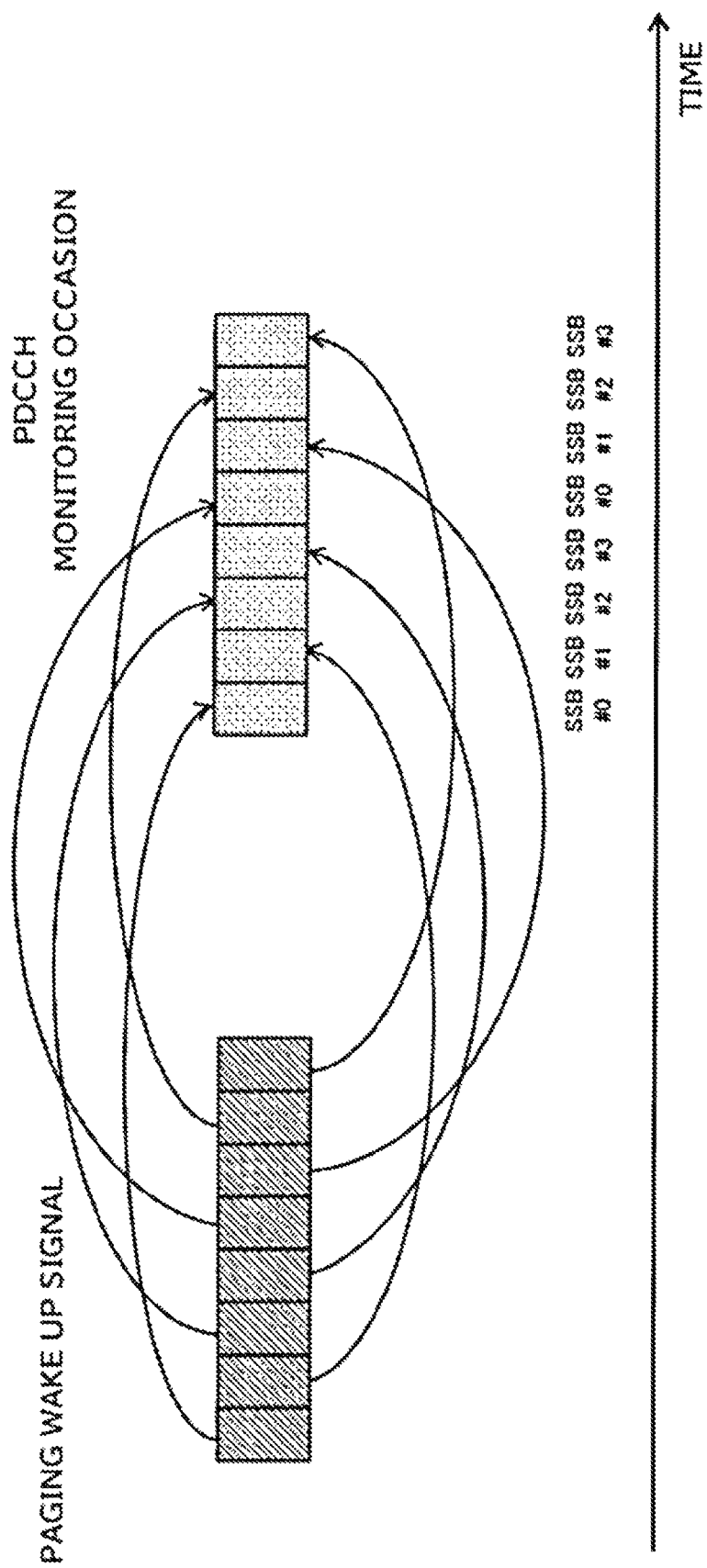
FIG. 4 A drawing illustrating an example (1) of a configuration related to paging in the embodiment of the invention.

FIG. 4 is a drawing illustrating an example (1) of a configuration related to paging in the embodiment of the invention. As shown in FIG. 4, a corresponding paging wake up signal may be configured for each PDCCH monitoring occasion. That is, the paging wake up signal and the PDCCH monitoring occasion may be associated with each other on a one-to-one basis. In the example shown in FIG. 4, eight paging wake up signals correspond to a PDCCH monitoring occasion associated with SSB #0, a PDCCH monitoring occasion associated with SSB #1, a PDCCH monitoring occasion associated with SSB #2, a PDCCH monitoring occasion associated with SSB #3, a PDCCH monitoring occasion associated with SSB #0, a PDCCH monitoring occasion associated with SSB #1, a PDCCH monitoring occasion associated with SSB #2, and a PDCCH monitoring occasion associated with SSB #3, respectively, in order from the beginning of the eight paging wake up signals.

Figure 5:
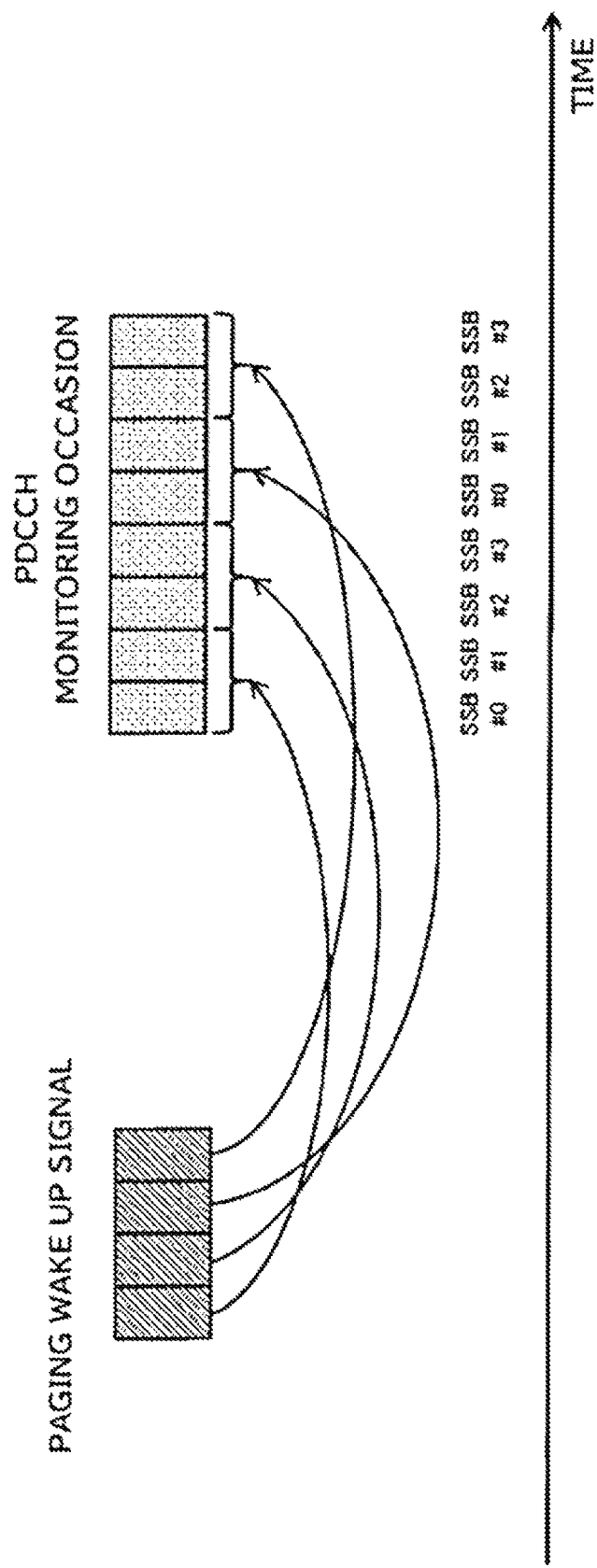
FIG. 5 A drawing illustrating an example (2) of a configuration related to paging in the embodiment of the invention.

FIG. 5 is a drawing illustrating an example (2) of a configuration related to paging in the embodiment of the invention. As shown in FIG. 5, a corresponding paging wake up signal may be configured for each of sets of two or more of PDCCH monitoring occasions associated with sets of two or more of SSBs. FIG. 5 is an example in which PDCCH monitoring occasions corresponding to two SSBs correspond to one paging wake up signal, and four paging wake up signals correspond to PDCCH monitoring occasions associated with SSB #0 and SSB #1, PDCCH monitoring occasions associated with SSB #2 and SSB #3, PDCCH monitoring occasions associated with SSB #0 and SSB #1, and PDCCH monitoring occasions associated with SSB #2 and SSB #3, respectively, in order from the beginning of the four paging wake up signals.

In addition, for example, the PDCCH monitoring occasions associated with all SSBs may correspond to one paging wake up signal.

Figure 6:
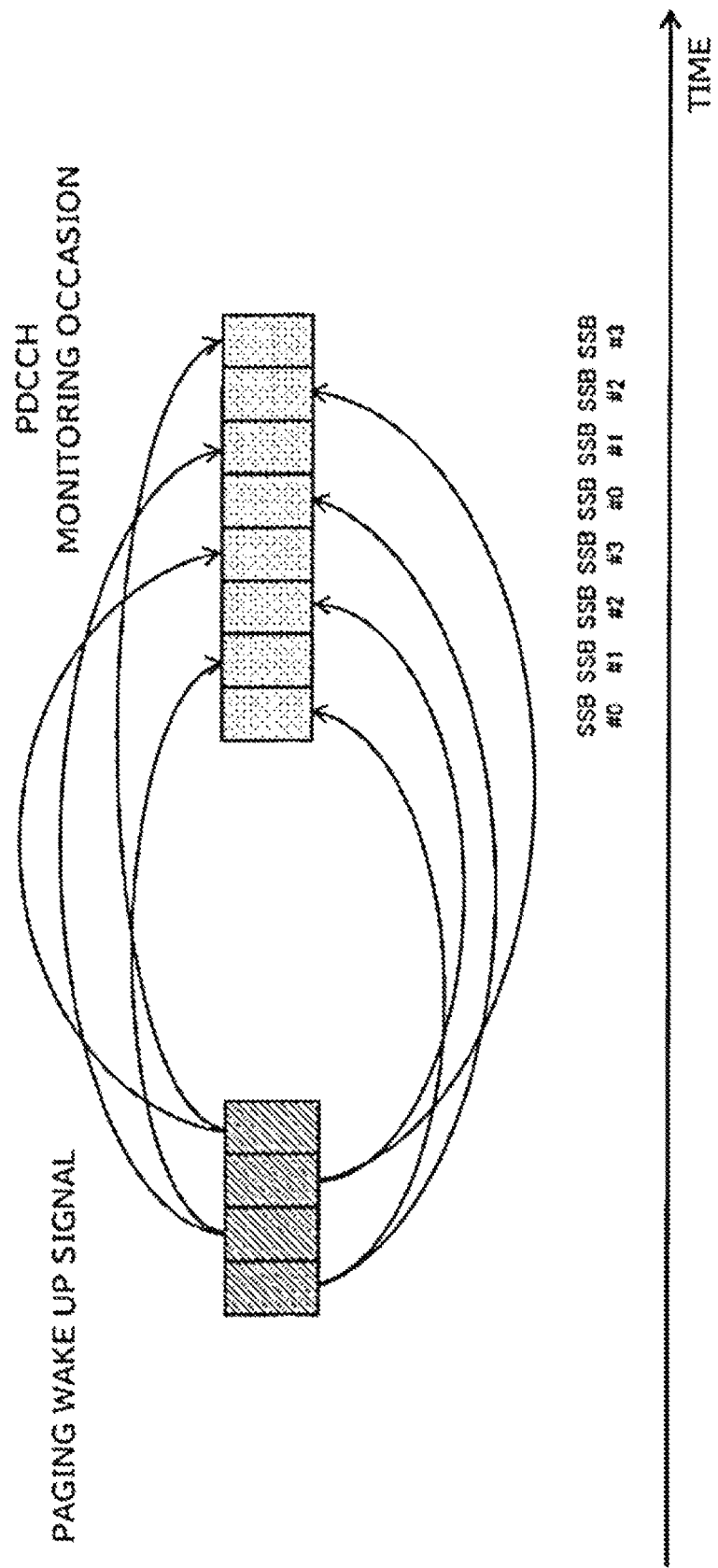
FIG. 6 A drawing illustrating an example (3) of a configuration related to paging in the embodiment of the invention.

FIG. 6 is a drawing illustrating an example (3) of a configuration related to paging in the embodiment of the invention. As shown in FIG. 6, a corresponding paging wake up signal may be configured for each of sets of two or more of PDCCH monitoring occasions corresponding to one SSB.

In FIG. 6, four paging wake up signals correspond to PDCCH monitoring occasions associated with SSB #0, PDCCH monitoring occasions associated with SSB #1, PDCCH monitoring occasions associated with SSB #2, and PDCCH monitoring occasions associated with SSB #3, respectively, in order from the beginning of the four paging wake up signals.

In addition, a sequence for a paging wake up signal may be used. The sequence may be newly defined, or a WUS sequence in LTE-IoT (Internet of Things) may be used.

In addition, the paging wake up signal may be transmitted as PDCCH. A DCI (Downlink Control Information) format applied to the PDCCH may be newly defined, or an existing format may be used. For example, DCI format 2_6 may be used for the PDCCH that is to be a paging wake up signal.

When the paging wake up signal is transmitted as a PDCCH, the base station 10 may indicate, to the terminal 20, whether or not the PDCCH needs to be monitored at the PDCCH monitoring occasion by using the paging wake up signal.

In addition, when the paging wake up signal is transmitted as a PDCCH, the base station 10 may indicate, to the terminal 20, the scheduling of the PDSCH including a paging message by using the paging wake up signal.

For example, whether or not to monitor the PDCCH at the PDCCH monitoring occasion may be switched according to whether or not the paging wake up signal has been detected at the specified position by the terminal 20. In a case where the paging wake up signal is detected, it may be indicated that the PDSCH may be directly received without PDCCH monitoring according to the paging wake up signal or the PDSCH need not be received. In a case where the paging wake up signal is not detected, the PDCCH may be monitored at the PDCCH monitoring occasion.

In addition, whether or not to monitor the PDCCH at the PDCCH monitoring occasion may be switched according to whether or not the paging wake up signal is configured in the terminal 20. In a case where the paging wake up signal is configured, it may be indicated that the PDSCH may be directly received without PDCCH monitoring according to the paging wake up signal or the PDSCH need not be received. In a case where the paging wake up signal is not configured, the PDCCH may be monitored at the PDCCH monitoring occasion.

According to the embodiment described above, the terminal 20 can determine the necessity of monitoring at the PDCCH monitoring occasion in advance, based on the paging wake up signal, and thus, it is possible to implement the power saving operation by suppressing unnecessary monitoring.

That is, it is possible to reduce the power consumption when monitoring paging in the radio communication system.

(Device Configuration)

Next, functional configuration examples of the base station 10 and the terminal 20 that execute the processes and the operations described so far will be described. The base station 10 and the terminal 20 have functions for implementing the embodiment described above. However, each of the base station 10 and the terminal 20 may have only some of the functions in the embodiment.

<Base Station 10>

Figure 7:
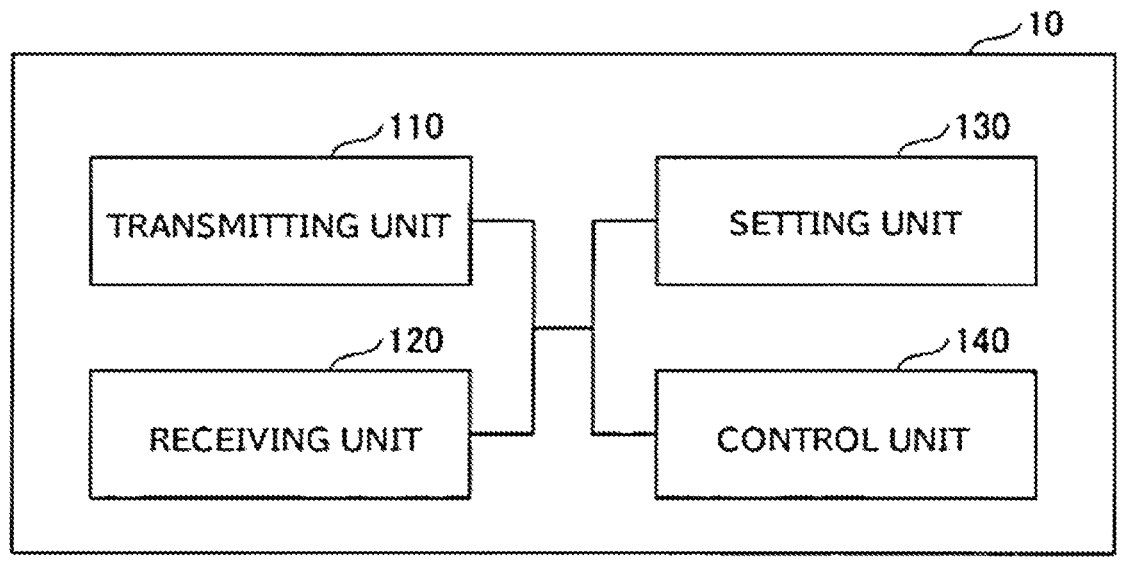
FIG. 7 A drawing illustrating an example of the functional configuration of a base station 10 in the embodiment of the invention.

FIG. 7 is a drawing illustrating an example of the functional configuration of the base station 10 according to an embodiment of the invention. As shown in FIG. 7, the base station 10 includes a transmitting unit 110, a receiving unit 120, a setting unit 130, and a control unit 140. The functional configuration shown in FIG. 7 is merely an example. As long as the operation according to the embodiment of the invention can be performed, any functional division and any name of each functional unit may be applied.

The transmitting unit 110 has a function of generating a signal to be transmitted to the terminal 20 and transmitting the signal wirelessly. In addition, the transmitting unit 110 transmits a message between network nodes to another network node. The receiving unit 120 has a function of receiving various signals transmitted from the terminal 20 and acquiring, for example, information of higher layers from the received signals. In addition, the transmitting unit 110 has a function of transmitting NR-PSS, NR-SSS, NR-PBCH, a DL/UL control signal, and the like to the terminal 20. In addition, the receiving unit 120 receives a message between network nodes from another network node.

The setting unit 130 stores pre-configured configuration information and various kinds of configuration information to be transmitted to the terminal 20. The content of the configuration information is, for example, a configuration related to the paging of the terminal 20.

As described in the embodiment, the control unit 140 performs control related to paging. A functional unit related to signal transmission in the control unit 140 may be included in the transmitting unit 110, and a functional unit related to signal reception in the control unit 140 may be included in the receiving unit 120.

<Terminal 20>

Figure 8:
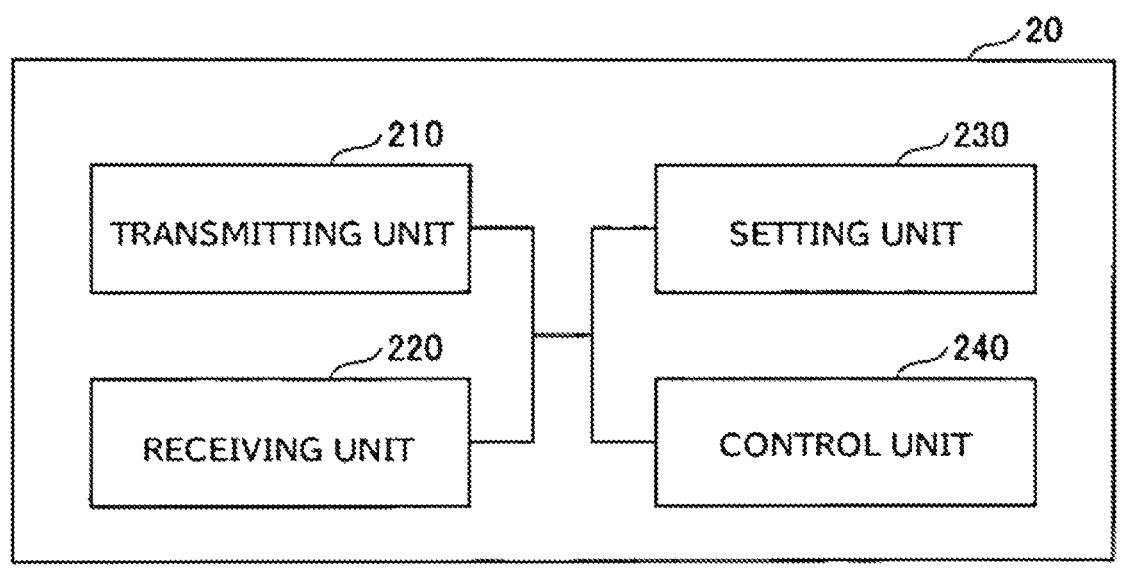
FIG. 8 A drawing illustrating an example of the functional configuration of a terminal 20 in the embodiment of the invention.

FIG. 8 is a drawing illustrating an example of the functional configuration of the terminal 20 according to an embodiment of the invention. As shown in FIG. 8, the terminal 20 includes a transmitting unit 210, a receiving unit 220, a setting unit 230, and a control unit 240. The functional configuration shown in FIG. 8 is merely an example. As long as the operation according to the embodiment of the invention can be performed, any functional division and any name of each functional unit may be applied.

The transmitting unit 210 generates a transmission signal from transmission data, and transmits the transmission signal wirelessly. The receiving unit 220 wirelessly receives various signals, and acquires a higher-layer signal from the received physical layer signal. In addition, the receiving unit 220 has a function of receiving NR-PSS, NR-SSS, NR-PBCH, a DL/UL/SL control signal, and the like transmitted from the base station 10. In addition, for example, the transmitting unit 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel), and the like to another terminal 20 as D2D communication, and the receiving unit 220 receives the PSCCH, the PSSCH, the PSDCH, the PSBCH, and the like from another terminal 20.

The setting unit 230 stores various kinds of configuration information received from the base station 10 by the receiving unit 220. In addition, the setting unit 230 stores the pre-configured configuration information. The content of the configuration information is, for example, a setting related to the paging of the terminal 20.

As described in the embodiment, the control unit 240 performs control related to paging. A functional unit related to signal transmission in the control unit 240 may be included in the transmitting unit 210, and a functional unit related to signal reception in the control unit 240 may be included in the receiving unit 220.

(Hardware Configuration)

The block diagrams (FIGS. 7 and 8) used in the description of the above embodiment show blocks in functional units. These functional blocks (configuration units) are implemented by any combination of at least one of hardware and software. In addition, a method of implementing each functional block is not particularly limited. That is, each functional block may be implemented using one physically or logically coupled device, or may be implemented by connecting two or more physically or logically separated devices directly or indirectly (for example, using a wired or radio connection) and using the plurality of devices. Each functional block may be implemented by combining the above-described one device or the above-described plurality of devices with software.

Functions include determining, judging, calculating, computing, processing, deriving, investigating, searching, ascertaining, receiving, transmitting, outputting, accessing, resolving, selecting, choosing, establishing, comparing, assuming, expecting, presuming, broadcasting, notifying, communicating, forwarding, configuring, reconfiguring, allocating, mapping, assigning, and the like, but are not limited thereto. For example, a functional block (configuration unit) that makes the transmission work is called a transmitting unit or a transmitter. In any case, as described above, the implementation method is not particularly limited.

Figure 9:
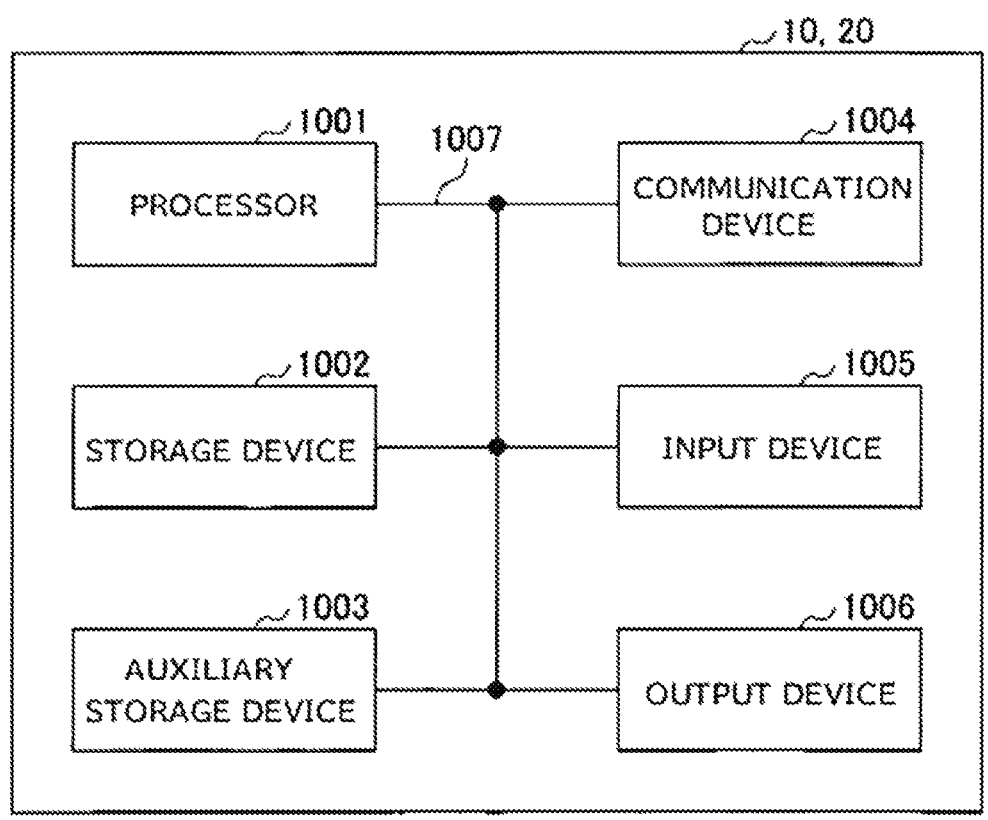
FIG. 9 A drawing illustrating an example of the hardware configuration of the base station 10 or the terminal 20 in the embodiment of the invention.

For example, the base station 10, the terminal 20, and the like according to an embodiment of the present disclosure may function as a computer that performs processing of the radio communication method according to the present disclosure. FIG. 9 is a diagram showing an example of the hardware configuration of the base station 10 and the terminal 20 according to an embodiment of the present disclosure. Each of the base station 10 and the terminal 20 described above may be physically configured as a computer apparatus including a processor 1001, a storage device 1002, an auxiliary storage device 1003, a communication device 1004, an input device 1005, an output device 1006, a bus 1007, and the like.

In addition, in the following description, the term "device" can be read as a circuit, a unit, and the like. The hardware configuration of each of the base station 10 and the terminal 20 may be configured to include one or more devices for each of the devices shown in the diagram, or may be configured not to include some devices.

Each function in the base station 10 and the terminal 20 is implemented by reading predetermined software (program) onto hardware, such as the processor 1001 and the storage device 1002, so that the processor 1001 performs an operation and controls communication by the communication device 1004 or controls at least one of reading and writing of data in the storage device 1002 and the auxiliary storage device 1003.

The processor 1001 controls the entire computer by operating an operating system, for example. The processor 1001 may be configured by a central processing unit (CPU) including an interface with peripheral equipment, a control device, an operation device, a register, and the like. For example, the control unit 140, the control unit 240, and the like described above may be implemented by the processor 1001.

In addition, the processor 1001 reads a program (program code), a software module, data, and the like into the storage device 1002 from at least one of the auxiliary storage device 1003 and the communication device 1004, and executes various kinds of processing according to these. As the program, a program causing a computer to execute at least a part of the operation described in the above embodiment is used. For example, the control unit 140 of the base station 10 shown in FIG. 7 may be implemented by a control program that is stored in the storage device 1002 and operated by the processor 1001. In addition, for example, the control unit 240 of the terminal 20 shown in FIG. 8 may be implemented by a control program that is stored in the storage device 1002 and operated by the processor 1001. Although it has been described that the various kinds of processing described above are executed by one processor 1001, the various kinds of processing described above may be executed simultaneously or sequentially by two or more processors 1001. The processor 1001 may be implemented by one or more chips. In addition, the program may be transmitted from a network through a telecommunication line.

The storage device 1002 is a computer-readable recording medium, and may be configured by at least one of, for example, a ROM (Read Only Memory), an EPROM (Erasable Programmable ROM), an EEPROM (Electrically Erasable Programmable ROM), and a RAM (Random Access Memory). The storage device 1002 may be called a register, a cache, a main memory, and the like. The storage device 1002 can store a program (program code), a software module, and the like that can be executed to execute the communication method according to an embodiment of the present disclosure.

The auxiliary storage device 1003 is a computer-readable recording medium, and may be configured by at least one of, for example, an optical disc such as a CD-ROM (Compact Disc ROM), a hard disk drive, a flexible disk, and a magneto-optical disk (for example, a compact disk, a digital versatile disk, and a Blu-ray (Registered trademark) disk), a smart card, a flash memory (for example, a card, a stick, a key drive), a floppy (registered trademark) disk, and a magnetic strip. The storage medium described above may be, for example, a database including at least one of the storage device 1002 and the auxiliary storage device 1003, a server, or other appropriate media.

The communication device 1004 is hardware (transmitting and receiving device) for performing communication between computers through at least one of a wired network and a radio network, and is also referred to as, for example, a network device, a network controller, a network card, and a communication module. The communication device 1004 may be configured to include, for example, a high-frequency switch, a duplexer, a filter, a frequency synthesizer, and the like in order to realize at least one of frequency division duplex (FDD) and time division duplex (TDD), for example. For example, a transmitting and receiving antenna, an amplifier unit, a transmitting and receiving unit, a transmission line interface, and the like may be implemented by the communication device 1004. The transmitting and receiving unit may be implemented so as to be physically or logically separated from the transmitting unit and the receiving unit.

The input device 1005 is an input device (for example, a keyboard, a mouse, a microphone, a switch, a button, and a sensor) for receiving an input from the outside. The output device 1006 is an output device (for example, a display, a speaker, and an LED lamp) that performs output to the outside. In addition, the input device 1005 and the output device 1006 may be integrated (for example, a touch panel).

In addition, respective devices, such as the processor 1001 and the storage device 1002, are connected to each other by the bus 1007 for communicating information. The bus 1007 may be configured using a single bus, or may be configured using a different bus for each device.

In addition, each of the base station 10 and the terminal 20 may be configured to include hardware, such as a microprocessor, a digital signal processor (DSP), an ASIC (Application Specific Integrated Circuit), a PLD (Programmable Logic Device), and an FPGA (Field Programmable Gate Array), and some or all of the functional blocks may be implemented by the hardware. For example, the processor 1001 may be implemented using at least one of these hardware components.

Summary of Embodiment

As described above, according to the embodiment of the invention, there is provided a terminal including: a receiving unit configured to receive signals indicating whether or not monitoring of PDCCH (Physical Downlink Control Channel) monitoring occasions for paging is necessary, prior to the PDCCH monitoring occasions, from a base station; and a control unit configured to determine whether or not to monitor the PDCCH monitoring occasions, based on the signals.

With the configuration described above, the terminal 20 can determine the necessity of monitoring at the PDCCH monitoring occasion in advance, based on the paging wake up signal, and thus, it is possible to implement the power saving operation by suppressing unnecessary monitoring. That is, it is possible to reduce the power consumption when monitoring paging in the radio communication system.

The control unit may identify, from one of signals, one of the PDCCH monitoring occasions. With this configuration, the terminal 20 can identify a PDCCH monitoring occasion to be monitored, based on the paging wake up signal.

The control unit may identify, from one of the signals, two or more of the PDCCH monitoring occasions associated with two or more of SSBs (SS PBCH/blocks). With this configuration, the terminal 20 can identify PDCCH monitoring occasions to be monitored, based on the paging wake up signal.

The control unit may identify, from one of the signals, two or more of the PDCCH monitoring occasions associated with one of SSBs. With this configuration, the terminal 20 can identify PDCCH monitoring occasions to be monitored based on the paging wake up signal.

The signal may be transmitted from the base station as a PDCCH. With this configuration, the terminal 20 can determine whether or not to monitor the PDCCH monitoring occasion.

In addition, according to the embodiment of the invention, there is provided a communication method in which a terminal executes: receiving signals indicating whether or not monitoring of PDCCH (Physical Downlink Control Channel) monitoring occasions for paging is necessary, prior to the PDCCH monitoring occasions, from a base station; and determining whether or not to monitor the PDCCH monitoring occasions, based on the signals.

With the configuration described above, the terminal 20 can determine the necessity of monitoring at the PDCCH monitoring occasion in advance, based on the paging wake up signal, and thus, it is possible to implement the power saving operation by suppressing unnecessary monitoring. That is, it is possible to reduce the power consumption when monitoring paging in the radio communication system.

Supplement to Embodiments

While the embodiments of the invention have been described above, the disclosed invention is not limited to such embodiments, and those skilled in the art will understand various variations, modifications, alternatives, substitutions, and the like. Although the description has been made using specific numerical examples to facilitate the understanding of the invention, those numerical values are merely examples and any appropriate values may be used unless otherwise specified. The division of the items in the above description is not essential to the invention, and the matters described in two or more items may be used in combination as necessary, or the matter described in a given item may be applied to the matter described in another item (unless there is a contradiction). The boundaries between functional units or processing units in the functional block diagrams do not always correspond to the boundaries between physical components. The operation of a plurality of functional units may be physically performed by one component, or the operation of one functional unit may be physically performed by a plurality of components. In the processing procedure described in the embodiment, the order of the processing may be changed as long as there is no contradiction. Although the base station 10 and the terminal 20 have been described using functional block diagrams for convenience of description of the processing, such equipment may be implemented by hardware, software, or a combination thereof. The software operated by the processor of the base station 10 according to the embodiment of the invention and the software operated by the processor of the terminal 20 according to the embodiment of the invention may be stored in a random access memory (RAM), a flash memory, a read only memory (ROM), an EPROM, an EEPROM, a register, a hard disk (HDD), a removable disk, a CD-ROM, a database, a server, or any other appropriate storage media.

In addition, the notification of information is not limited to the aspect/embodiment described in the present disclosure, and may be performed using other methods. For example, the notification of information may be performed using physical layer signaling (for example, DCI (Downlink Control Information), UCI (Uplink Control Information)), higher layer signaling (for example, RRC (Radio Resource Control) signaling, MAC (Medium Access Control) signaling, broadcast information (MIB (Master Information Block), SIB (System Information Block)), other signals, or a combination thereof. In addition, the RRC signaling may be called an RRC message, and may be, for example, an RRC connection setup message or an RRC connection reconfiguration message.

Each aspect/embodiment described in the present disclosure may be applied to at least one of systems, which use LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and next-generation systems extended based on these. In addition, a plurality of systems may be combined (for example, a combination of 5G and at least one of LTE and LTE-A) to be applied.

In the processing procedure, sequence, flowchart, and the like in each aspect/embodiment described in this specification, the order may be changed as long as there is no contradiction. For example, for the methods described in the present disclosure, elements of various steps are presented using an exemplary order, and the invention is not limited to the specific order presented.

The specific operation described as being performed by the base station 10 in this specification may be performed by its upper node in some cases. In a network including one or more network nodes each having the base station 10, it is obvious that various operations performed for communication with the terminal 20 can be performed by at least one of the base station 10 and other network nodes (for example, MME, S-GW, and the like can be considered, but the network node is not limited thereto) other than the base station 10. Although the case where the number of other network nodes other than the base station 10 is one has been exemplified above, the other network nodes may be a combination (for example, MME and S-GW) of a plurality of other network nodes.

Information or signals described in the present disclosure can be output from a higher layer (or a lower layer) to a lower layer (or a higher layer). Information or signals described in the present disclosure may be input and output through a plurality of network nodes.

Information or the like that is input and output may be stored in a specific place (for example, a memory) or may be managed using a management table. The information or the like that is input and output can be overwritten, updated, or added. The information or the like that is output may be deleted. The information or the like that is input may be transmitted to another device.

The judging in the present disclosure may be performed based on a value expressed by 1 bit (0 or 1), may be performed based on Boolean (true or false), or may be performed by numerical value comparison (for example, comparison with a given value).

Software, regardless of whether this is called software, firmware, middleware, microcode, a hardware description language, or any other name, should be interpreted broadly to mean instructions, instruction sets, codes, code segments, program codes, programs, subprograms, software modules, applications, software applications, software packages, routines, subroutines, objects, executable files, execution threads, procedures, functions, and the like.

In addition, software, instructions, information, and the like may be transmitted and received through a transmission medium. For example, in a case where software is transmitted from a website, a server, or other remote sources using at least one of a wired technology (coaxial cable, optical fiber cable, twisted pair, digital subscriber line (DSL), and the like) and a wireless technology (infrared, microwave, and the like), at least one of the wired technology and the wireless technology is included within the definition of the transmission medium.

The information, signals, and the like described in the present disclosure may be expressed using any of a variety of different technologies. For example, data, instructions, commands, information, signals, bits, symbols, and chips that can be referred to throughout the above description may be represented by voltage, current, electromagnetic waves, magnetic field or magnetic particles, light field or photon, or any combination thereof.

In addition, the terms described in the present disclosure and the terms necessary for understanding the present disclosure may be replaced with terms having the same or similar meaning. For example, at least one of the channel and the symbol may be a signal (signaling). In addition, the signal may be a message. In addition, a component carrier (CC) may be called a carrier frequency, a cell, a frequency carrier, or the like.

The terms "system" and "network" used in the present disclosure are used interchangeably.

In addition, the information, parameters, and the like described in the present disclosure may be expressed using an absolute value, may be expressed using a relative value from a predetermined value, or may be expressed using another corresponding information. For example, the radio resource may be indicated by an index.

The names used for the parameters described above are not limiting names in any way. In addition, equations and the like using these parameters may be different from those explicitly disclosed in the present disclosure. Since various channels (for example, a PUCCH and a PDCCH) and information elements can be identified by any suitable names, various names allocated to these various channels and information elements are not limiting names in any way.

In the present disclosure, terms such as "base station (BS)", "radio base station", "base station equipment", "fixed station", "NodeB", "eNodeB (eNB)", "gNodeB (gNB)", "access point", "transmission point", "reception point", "transmission/reception point", "cell", "sector", "cell group", "carrier", and "component carrier" can be used interchangeably. The base station may also be referred to as terms, such as a macro cell, a small cell, a femto cell, and a pico cell.

The base station can include one or more (for example, three) cells. When the base station includes a plurality of cells, the entire coverage area of the base station can be divided into a plurality of smaller areas, and each of the smaller areas can also provide a communication service using a base station subsystem (for example, a remote radio head (RRH)). The term "cell" or "sector" refers to a part or the entirety of the coverage area of at least one of a base station and a base station subsystem that provides communication services in this coverage.

In the present disclosure, the terms such as "mobile station (MS)", "user terminal", "user equipment (UE)", and "terminal" can be used interchangeably.

The mobile station may also be called a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client, or some other appropriate terms depending on those skilled in the art.

At least one of the base station and the mobile station may be called a transmitting device, a receiving device, a communication device, and the like. In addition, at least one of the base station and the mobile station may be a device mounted on a moving body, the moving body itself, and the like. The moving body may be a vehicle (for example, a car or an airplane), an unmanned moving body (for example, a drone or a self-driving car), or a robot (maned or unmanned). In addition, at least one of the base station and the mobile station necessarily includes a device that does not move during a communication operation. For example, at least one of the base station and the mobile station may be an IoT (Internet of Things) device, such as a sensor.

In addition, the base station in the present disclosure may be read as a user terminal. For example, each aspect/embodiment of the present disclosure may be applied to a configuration in which communication between a base station and a user terminal is replaced with communication between a plurality of terminals 20 (which may be called, for example, D2D (Device-to-Device) or V2X (Vehicle-to-Everything)). In this case, the terminal 20 may have the above-described function of the base station 10. In addition, terms such as "uplink" and "downlink" may be read as terms corresponding to terminal-to-terminal communication (for example, "side"). For example, an uplink channel, a downlink channel, and the like may be read as a side channel.

Similarly, the user terminal in the present disclosure may be read as a base station. In this case, the base station may have the above-described function of the user terminal.

The terms "determining" used in the present disclosure may involve a wide variety of operations. For example, "determining" can include considering judging, calculating, computing, processing, deriving, investigating, looking up (search, inquiry) (for example, looking up in a table, database, or another data structure), and ascertaining as "determining". In addition, "determining" can include considering receiving (for example, receiving information), transmitting (for example, transmitting information), input, output, and accessing (for example, accessing data in a memory) as "determining". In addition, "determining" can include considering resolving, selecting, choosing, establishing, comparing, and the like as "determining". In other words, "determining" can include considering any operation as "determining". In addition, "determining" may be read as "assuming", "expecting", "considering", and the like.

The terms "connected" and "coupled" or variations thereof mean any direct or indirect connection or coupling between two or more elements, and can include a case where one or more intermediate elements are present between two elements "connected" or "coupled" to each other. The coupling or connection between elements may be physical, logical, or a combination thereof. For example, "connection" may be read as "access". When used in the present disclosure, two elements can be considered to be "connected" or "coupled" to each other using at least one of one or more wires, cables, and printed electrical connections and using some non-limiting and non-inclusive examples, such as electromagnetic energy having wavelengths in a radio frequency domain, a microwave domain, and a light (both visible and invisible) domain.

The reference signal may be abbreviated as RS (Reference Signal), and may be called Pilot according to the applied standard.

The description "based on" used in the present disclosure does not mean "based only on" unless otherwise specified. In other words, the description "based on" means both "based only on" and "based at least on".

Any reference to elements using designations such as "first" and "second" used in the present disclosure does not generally limit the quantity or order of the elements. These designations can be used in the present disclosure as a convenient method for distinguishing between two or more elements. Therefore, references to first and second elements do not mean that only two elements can be adopted or that the first element should precede the second element in any way.

"Means" in the configuration of each device described above may be replaced with "unit", "circuit", "device", and the like.

When "include", "including", and variations thereof are used in the present disclosure, these terms are intended to be inclusive similarly to the term "comprising". In addition, the term "or" used in the present disclosure is intended not to be an exclusive-OR.

A radio frame may be configured by one or more frames in the time domain. Each of one or more frames in the time domain may be referred to as a subframe. In addition, the subframe may be configured by one or more slots in the time domain. The subframe may be a fixed time length (for example, 1 ms) that does not depend on numerology.

Numerology may be a communication parameter applied to at least one of transmission and reception of a given signal or channel. Numerology may indicate at least one of, for example, subcarrier spacing (SCS), bandwidth, symbol length, cyclic prefix length, transmission time interval (TTI), the number of symbols per TTI, radio frame configuration, specific filtering processing performed in the frequency domain by the transceiver, and specific windowing processing performed in the time domain by the transceiver.

A slot may be configured by one or more symbols (OFDM (Orthogonal Frequency Division Multiplexing) symbol, SC-FDMA (Single Carrier Frequency Division Multiple Access) symbol, and the like) in the time domain. A slot may be a time unit based on numerology.

A slot may include multiple mini-slots. Each mini-slot may be configured by one or more symbols in the time domain. In addition, the mini-slot may be called a subslot. A mini-slot may be configured by a smaller number of symbols than that in a slot. A PDSCH (or a PUSCH) transmitted in time units larger than the mini-slot may be referred to as PDSCH (or PUSCH) mapping type A. A PDSCH (or a PUSCH) transmitted using a mini-slot may be referred to as PDSCH (or PUSCH) mapping type B.

Each of the radio frame, the subframe, the slot, the mini-slot, and the symbol indicates a time unit when transmitting a signal. The radio frame, the subframe, the slot, the mini-slot, and the symbol may have different names corresponding thereto.

For example, one subframe may be called a transmission time interval (TTI), a plurality of consecutive subframes may be called a TTI, and one slot or one mini-slot may be called a TTI. That is, at least one of the subframe and the TTI may be a subframe (1 ms) in the known LTE, a period (for example, 1 to 13 symbols) shorter than 1 ms, or a period longer than 1 ms. In addition, the unit indicating the TTI may be called a slot, a mini-slot, or the like, instead of a subframe.

Here, the TTI refers to, for example, a minimum time unit of scheduling in radio communication. For example, in the LTE system, the base station performs scheduling for allocating radio resources (frequency bandwidth, transmission power, and the like that can be used in each terminal 20) to each terminal 20 in TTI units. In addition, the definition of the TTI is not limited to this.

The TTI may be a transmission time unit, such as a channel-encoded data packet (transport block), a code block, and a code word, or may be a processing unit, such as scheduling and link adaptation. In addition, when a TTI is given, a time section (for example, the number of symbols) in which a transport block, a code block, a code word, and the like are actually mapped may be shorter than the TTI.

In addition, when one slot or one mini-slot is called a TTI, one or more TTIs (that is, one or more slots or one or more mini-slots) may be a minimum time unit for scheduling. In addition, the number of slots (the number of mini-slots) configuring the minimum time unit of the scheduling may be controlled.

A TTI having a time length of 1 ms may be called a normal TTI (TTI in LTE Rel. 8-12), a long TTI, a normal subframe, a long subframe, a slot, and the like. A TTI shorter than the normal TTI may be called a short TTI, a partial or fractional TTI, a short subframe, a mini-slot, a subslot, a slot, and the like.

In addition, a long TTI (for example, a normal TTI or a subframe) may be read as a TTI having a time length exceeding 1 ms, and a short TTI may be read as a TTI shorter than the TTI length of the long TTI and equal to or longer than 1 ms.

A resource block (RB) is a resource allocation unit in the time domain and the frequency domain, and may include one or more consecutive subcarriers in the frequency domain. The number of subcarriers included in the RB may be the same regardless of numerology, and may be, for example, 12. The number of subcarriers included in the RB may be determined based on numerology.

In addition, the time domain of the RB may include one or more symbols, and may be the length of one slot, one mini-slot, one subframe, or one TTI. One TTI, one subframe, and the like may each be configured by one or more resource blocks.

In addition, one or more RBs may be called a physical resource block (PRB: Physical RB), a sub-carrier group (SCG), a resource element group (REG), a PRB pair, an RB pair, and the like.

In addition, the resource block may be configured by one or more resource elements (REs). For example, one RE may be a radio resource area of one subcarrier and one symbol.

A bandwidth part (BWP) (which may be called a partial bandwidth or the like) may indicate a subset of consecutive common resource blocks (RBs) for given numerology in a given carrier. Here, the common RB may be specified by an index of the RB with the common reference point of the carrier as a reference. The PRB may be defined by a given BWP and numbered within the BWP.

The BWP may include a BWP for UL (UL BWP) and a BWP for DL (DL BWP). For the UE, one or more BWPs may be set in one carrier.

At least one of the set BWPs may be active, and it may not be assumed that the UE transmits and receives a predetermined signal/channel outside the active BWP. In addition, "cell", "carrier", and the like in the present disclosure may be read as "BWP".

The structures of the radio frame, the subframe, the slot, the mini-slot, and the symbol described above are merely examples. For example, the number of subframes included in a radio frame, the number of slots per subframe or radio frame, the number of mini-slots included in a slot, the number of symbols and RBs included in a slot or mini-slot, the number of subcarriers included in an RB, the number of symbols in the TTI, the symbol length, the cyclic prefix (CP) length, and the like can be changed in various ways.

In the present disclosure, in a case where articles, for example, a, an, and the in English, are added by translation, the present disclosure may include that nouns subsequent to these articles are plural.

In the present disclosure, the expression "A and B are different" may mean "A and B are different from each other". In addition, the expression may mean that "A and B each are different from C". Terms such as "separate", "coupled" may be interpreted similarly to "different".

Each aspect/embodiment described in the present disclosure may be used alone, may be used in combination, or may be switched and used according to execution. In addition, the indication of predetermined information (for example, indication of "X") is not limited to being explicitly performed, and may be performed implicitly (for example, without the indication of the predetermined information).

In addition, in the present disclosure, the paging wake up signal is an example of a signal indicating whether or not it is necessary to monitor a PDCCH (Physical Downlink Control Channel) monitoring occasion for paging.

While the present disclosure has been described in detail, it is apparent to those skilled in the art that the present disclosure is not limited to the embodiments described in the present disclosure. The present disclosure can be implemented with modified and changed aspects without departing from the spirit and scope of the present disclosure defined by the description of the claims. Therefore, the description of the present disclosure is intended for illustrative purposes, and has no restrictive meaning to the present disclosure.

EXPLANATIONS OF LETTERS OR NUMERALS

10 BASE STATION
110 TRANSMITTING UNIT
120 RECEIVING UNIT
130 SETTING UNIT
140 CONTROL UNIT
20 TERMINAL
210 TRANSMITTING UNIT
220 RECEIVING UNIT
230 SETTING UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
a receiver that receives, from a base station, a paging wake-up signal transmitted as a PDCCH (Physical Downlink Control Channel); and
a processor that monitors a PDCCH monitoring occasion associated with the paging wake-up signal, wherein
the paging wake-up signal indicates whether or not the terminal needs to monitor the PDCCH monitoring occasion,
the processor determines, based on the paging wake-up signal, whether or not to monitor the PDCCH monitoring occasion, and
PDCCH monitoring occasions corresponding to a plurality of SSBs (SS/PBCH blocks) transmitted from the base station correspond to a single paging wake-up signal.

2. The terminal according to claim 1, wherein a format of downlink control information is applied to the PDCCH used for transmission of the paging wake-up signal.

3. A communication method performed by a terminal, the communication method comprising:
receiving, from a base station, a paging wake-up signal transmitted as a PDCCH (Physical Downlink Control Channel);
monitoring a PDCCH monitoring occasion associated with the paging wake-up signal, wherein the paging wake-up signal indicates whether or not the terminal needs to monitor the PDCCH monitoring occasion; and
determining, based on the paging wake-up signal, whether or not to monitor the PDCCH monitoring occasion,
wherein PDCCH monitoring occasions corresponding to a plurality of SSBs (SS/PBCH blocks) transmitted from the base station correspond to a single paging wake-up signal.

4. A communication system comprising a terminal and a base station, wherein the base station transmits a paging wake-up signal transmitted as a PDCCH (Physical Downlink Control Channel), the terminal receives the paging wake-up signal from the base station, and monitors PDCCH monitoring occasions associated with the paging wake-up signal, wherein the paging wake-up signal indicates whether or not the terminal needs to monitor the PDCCH monitoring occasion, the terminal determines, based on the paging wake-up signal, whether or not to monitor the PDCCH monitoring occasion, and PDCCH monitoring occasions corresponding to a plurality of SSBs (SS/PBCH blocks) transmitted from the base station correspond to a single paging wake-up signal.

* * * * *